UNITED STATES PATENT OFFICE.

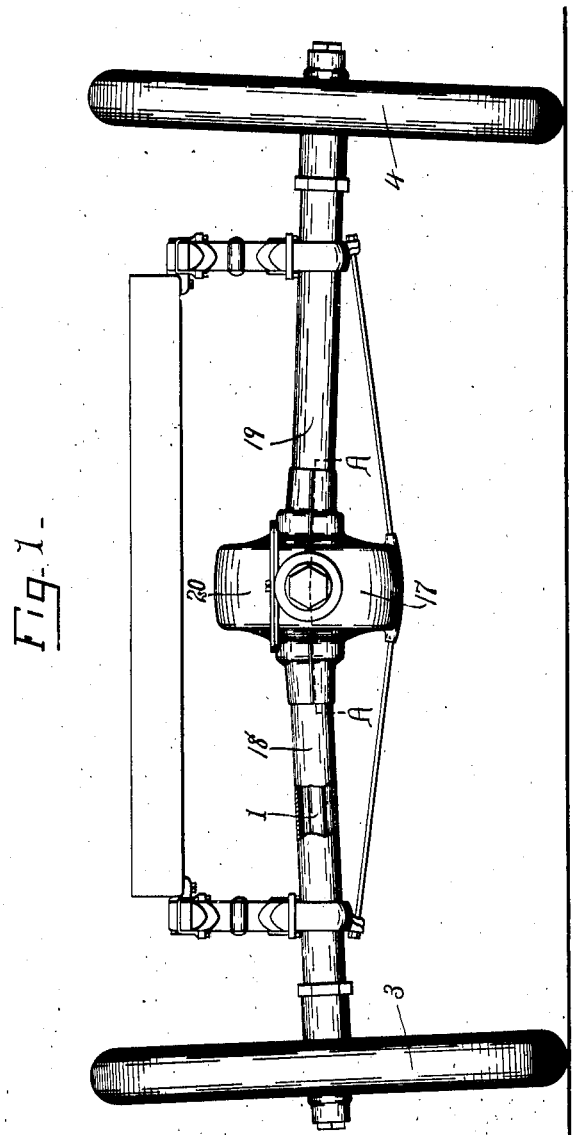

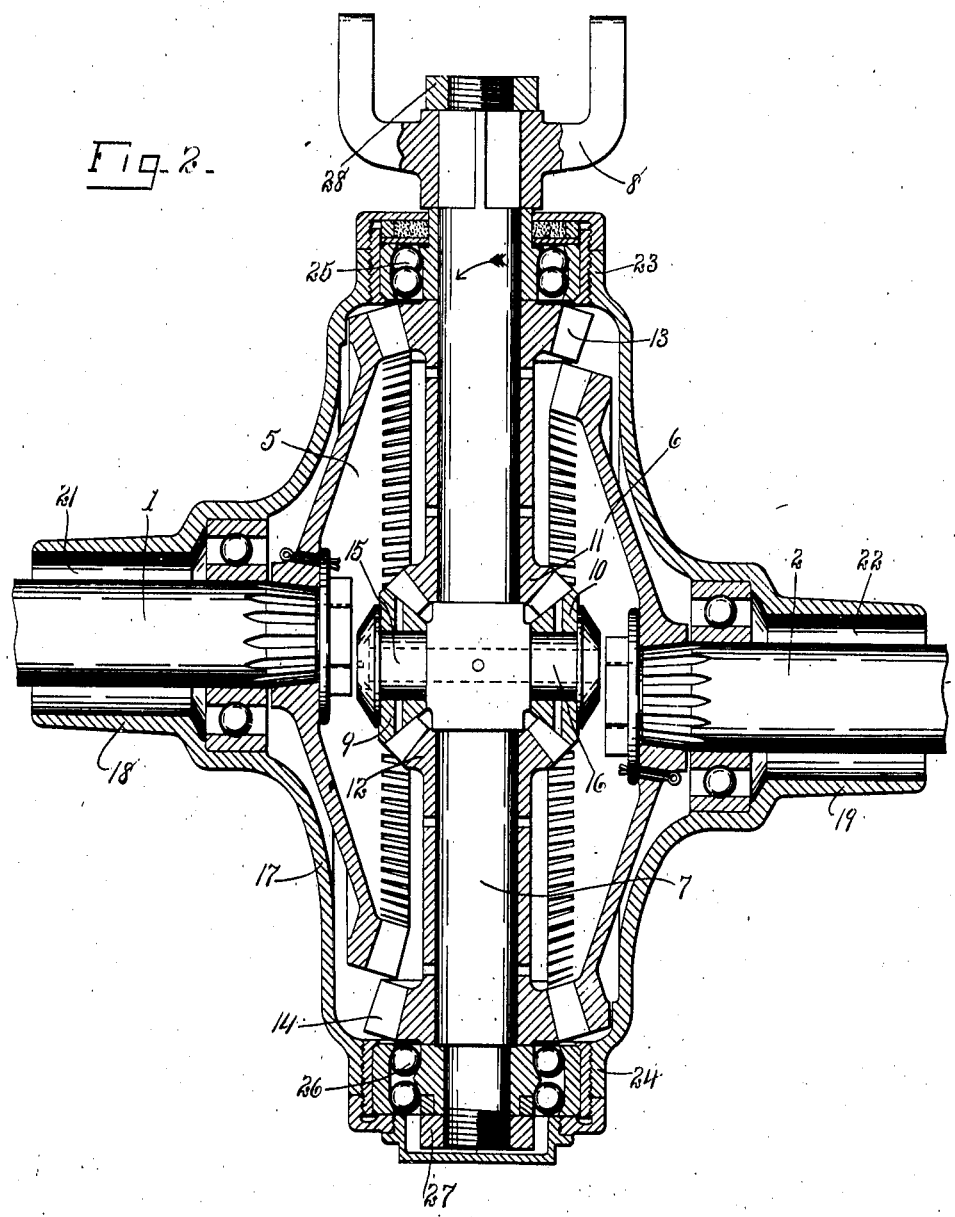

ALEXANDER T. BROWN, OF SYRACUSE, NEW YORK, ASSIGNOR TO THE BROWN-LIPE GEAR COMPANY, OF SYRACUSE, NEW YORK, A COPARTNERSHIP.

POWER-TRANSMITTING MECHANISM.

No. 814,268.

Specification of Letters Patent.

Patented March 6, 1906.

Application filed December 7, 1905. Serial No. 290,685.

*To all whom it may concern:*

Be it known that I, ALEXANDER T. BROWN, of Syracuse, in the county of Onondaga and State of New York, have invented a certain new and useful Power-Transmitting Mechanism, of which the following is a specification.

This invention relates to power-transmitting mechanism particularly applicable for use in self-propelled vehicles, and has for its object the production of means for the desired purpose which is especially simple in construction and highly efficient and durable in use; and to this end it consists in the novel combinations and constructions hereinafter set forth, and pointed out in the claims.

In describing this invention reference is had to the accompanying drawings, in which like characters designate corresponding parts in both the views.

Figure 1 is a rear elevation, partly in section, of a portion of a self-propelled vehicle including one embodiment of my invention. Fig. 2 is an enlarged sectional view, partly in elevation, on line A A, Fig. 1.

The illustrated exemplification of this invention includes driven and driving members and equalizing and transmitting gears.

The driven members 1 2 comprise an axle, are arranged substantially end to end with the axis of one in advance of and substantially parallel to the axis of the other, and are preferably inclined relatively to each other lengthwise of their axes from a horizontal plane. The outer ends of the driven members 1 2 are equipped with ground-wheels 3 4, and their inner ends are provided with gears 5 6 of equal diameter suitably secured thereto. The driving member 7 extends beyond opposite sides of the axes of the driven members 1 2 at a right angle to said driven members, is fixed from movement laterally relatively to the driven members, and is interposed between the gears 5 6. Said driving member preferably consists of a shaft having one end squared or otherwise formed for receiving a coupling-section 8, adapted to be secured to any suitable source of power, as an engine-shaft. (Not shown.)

In the illustrated embodiment of this invention the driving member 7 supports equalizing-gears 9 10 11 12 and transmitting-gears 13 14, the equalizing-gears 9 10 being mounted on laterally-projecting trunnions 15 16 on the driving member and arranged with their axes revoluble in a plane substantially parallel to and midway between the axes of the driven members 1 2 and the gears 11 12 being respectively fixed to the gears 13 14 and revoluble on the driving member 7 about the axis thereof. One side of the transmitting-gear 13 meshes at one side of the axes of the driven members 1 2 and at one side of the axis of the driving member 7 with the gear 5 on the driven member 1, and said gear 13 is disengaged from the gear 6 on the driven member 2, and the transmitting-gear 14 meshes at the opposite side of the axes of the driven members 1 2 and the opposite side of the axis of the driving member 7 with the gear 6 and is disengaged from said gear 5. The described engagement of the gears 13 14 with gears 5 6 of equal diameter is effected by arranging the driven members 1 2 with their axes one in advance of the other. To those skilled in the art it will be understood that if the driving member 7 revolves in a reverse direction to that indicated by the arrow, Fig. 2, it will be necessary to arrange the driven member 1 with its axis at the rear of the axis of the member 2 in order that the vehicle may move forwardly.

Equalizing and transmitting gears constructed and arranged as described form a particularly compact, simple, efficient, strong, and durable connection between the driven and driving members, and such connection consists of a minimum number of parts and when transmitting motion from the driving to the driven members equalizes the strain on opposite sides of the axes of said members and also permits of the necessary differential movement of the driven members.

In the illustrated embodiment of my invention the driven and driving members 1 2 7 are supported by a casing 17, comprising a central part and tubular shells or extensions 18 19. The central part of the casing 17 is provided with a detachable cap 20 and is formed with opposing side openings 21 22, through which the driven members 1 2 project, these openings being arranged with their axes one in advance of the other and being preferably inclined relatively to each other lengthwise of their axes from a horizontal plane and having their axes substantially coincident with the axes of the driven members 1 2. Said tubular shells or extensions 18 19 form continuations of the parts of the casing provided with the openings 21 22 and encircle and support the driven members 1 2, suitable antifriction-bearings for supporting such driven members being usually provided in the inner and outer ends of these extensions. The central part of the casing 17 is also provided with opposing extensions 23 24, arranged with their axes at a right angle to the axes of the openings 21 22, these extensions having their outer ends provided with detachable caps, one being formed with a central opening, through which the driving member 7 projects.

Suitable antifriction-bearings 25 26, fixed from movement laterally relatively to the driven members, are provided on the driving member 7 and arranged in the tubular extensions 23 24 of the casing 17. The inner sections of these bearings are engaged with the ends of the gears 13 14 and are also engaged by any suitable means, as the coupling-section 8 and a nut 27, revoluble with the driving member 7 and held from movement lengthwise thereof, and consequently said inner sections resist and equalize the end strain on the gears 13 14. The coupling-section 8 is here shown as engaged by a nut 28 on the driving member 7. As the bearings 25 26 form no part of my present invention, further description thereof is deemed unnecessary.

The described casing is simple in construction and forms a particularly efficient means for supporting and incasing the driven and driving members and the equalizing and transmitting mechanism; but it is apparent that other means may be used for supporting and inclosing these parts, and therefore I do not restrict this invention to such casing.

What I claim is—

1. In a vehicle, revoluble driven gears of substantially equal diameter arranged substantially end to end, with the axis of one in advance of, and substantially parallel to, the axis of the other, and transmitting-gears arranged on opposite sides of the axes of the driven gears, one of the transmitting-gears being in mesh with one of the driven gears and out of mesh with the other driven gear, and the other transmitting-gear being in mesh with said other driven gear and out of mesh with the opposing driven gear, substantially as and for the purpose described.

2. In a vehicle, revoluble driven gears of substantially equal diameter arranged substantially end to end, with the axis of one in advance of, and substantially parallel to, the axis of the other, transmitting-gears arranged on opposite sides of the axes of the driven gears, one of the transmitting-gears being in mesh with one of the driven gears and out of mesh with the other driven gear, and the other transmitting-gear being in mesh with said other driven gear and out of mesh with the opposing driven gear, and equalizing-gears connecting the transmitting-gears, one of the equalizing-gears being arranged with its axis revoluble in a plane substantially parallel to, and midway between, the axes of the driven gears, substantially as and for the purpose specified.

3. In a vehicle, an axle comprising a pair of revoluble shafts arranged substantially end to end, with the axis of one in advance of, and substantially parallel to, the axis of the other, ground-wheels carried by the outer ends of the shafts, gears of substantially equal diameter provided on the inner ends of the shafts, a driving member arranged with its axis at an angle to said shafts, a gear revoluble with the driving member and being in mesh with the gear on one of the shafts, and out of mesh with the gear on the other shaft, a second gear revoluble with the driving member and being in mesh with the gear on said other shaft and out of mesh with the gear meshing with the first-mentioned gear revoluble with the driving member, and equalizing-gears carried by the driving member and connected to said gears revoluble with the driving member, substantially as and for the purpose set forth.

4. In a vehicle, a casing provided with opposing openings, one being arranged with its axis in advance of, and substantially parallel to, the axis of the other, a third opening arranged substantially midway between the opposing openings at an angle thereto, driven members journaled in the opposing openings, and arranged with the axis of one in advance of, and substantially parallel to, the axis of the other, a driving member journaled in the third opening and arranged with its axis at an angle to the axes of the driven members, and power-transmitting means within the casing connecting the driven and driving members, substantially as and for the purpose described.

5. In a vehicle, a casing provided with opposing openings, one being arranged with its axis in advance of, and substantially parallel to, the axis of the other, a third opening arranged substantially midway between the opposing openings at an angle thereto, an axle comprising a pair of shafts journaled in the opposing openings, and arranged with the axis of one in advance of, and substantially parallel to, the axis of the other, ground-wheels carried by the outer ends of the shafts, gears of substantially equal diameter provided within the casing on the inner ends of the shafts, a driving member journaled in the third opening and arranged with its axis at an angle to the axes of the driven members, a gear within the casing revoluble with the driving member and being in mesh with the gear on one of the shafts, and out of mesh with the gear on the other shaft, a second gear within the casing revoluble with the driving member and being in mesh with the gear on said other shaft and out of mesh with the gear meshing with the first-mentioned gear revoluble with the driving member, and equalizing-gears within the casing carried by the driving member and connected to said gears revoluble with the driving members, one of the equalizing-gears being arranged with its axis revoluble in a plane substantially parallel to, and midway between, the axes of the driven gears, substantially as and for the purpose specified.

In testimony whereof I have hereunto signed my name, in the presence of two attesting witnesses, at Syracuse, in the county of Onondaga, in the State of New York, this 4th day of December, 1905.

ALEXANDER T. BROWN.

Witnesses:
S. DAVIS,
R. ARONSON.